United States Patent
Hegde et al.

(10) Patent No.: US 10,554,705 B2
(45) Date of Patent: Feb. 4, 2020

(54) SYSTEM AND METHOD FOR CONTROLLING CLIENT ELECTRONIC DEVICES IN WIRELESS LOCAL AD HOC NETWORK

(71) Applicant: SONY CORPORATION, Tokyo (JP)

(72) Inventors: Vedant B Hegde, Bangalore (IN);
Prakasha Nayak, Bangalore (IN);
Saraansh Dayal, Bangalore (IN);
Madhvesh Sulibhavi, Bangalore (IN)

(73) Assignee: SONY CORPORATION, Tokyo (JP)

( * ) Notice: Subject to any disclaimer, the term of this patent is extended or adjusted under 35 U.S.C. 154(b) by 191 days.

(21) Appl. No.: 15/660,011

(22) Filed: Jul. 26, 2017

(65) Prior Publication Data

US 2019/0036991 A1    Jan. 31, 2019

(51) Int. Cl.
*H04L 29/06* (2006.01)
*H04L 29/08* (2006.01)
(Continued)

(52) U.S. Cl.
CPC .......... *H04L 65/4038* (2013.01); *H04L 67/04* (2013.01); *H04W 4/06* (2013.01); *H04W 84/18* (2013.01)

(58) Field of Classification Search
CPC ......... H04M 2203/5072; H04M 3/566; H04M 3/569
See application file for complete search history.

(56) References Cited

U.S. PATENT DOCUMENTS 3,701,109 A * 10/1972 Peters ................... G06F 9/4825
                                                    710/244
8,970,662 B2    3/2015 Kerger et al.
(Continued)

FOREIGN PATENT DOCUMENTS

CN    105191252 A    12/2015
EP    1680935 B1     8/2013
(Continued)

OTHER PUBLICATIONS

Extended European Search Report of EP Patent Application No. 18182063.0, dated Sep. 4, 2018, 07 pages.
(Continued)

*Primary Examiner* — Chirag R Patel
(74) *Attorney, Agent, or Firm* — Chip Law Group

(57) ABSTRACT

Various aspects of a system and method for controlling client electronic devices in a wireless local ad hoc network are disclosed. The system includes one or more circuits in a server configured to receive a plurality of speaking-slot requests from a plurality of client electronic devices for a presented content. A client electronic device is selected based on an acceptance of a corresponding speaking-slot request. The acceptance of the corresponding speaking-slot request is based on at least an analysis of the one or more image frames of a user associated with the client electronic device and a context of the presented content. At least an audio stream provided by the user is received from the selected client electronic device. The selected client electronic device is controlled based on one or more parameters associated with at least the selected client electronic device.

19 Claims, 10 Drawing Sheets

(51) Int. Cl.
*H04W 4/06* (2009.01)
*H04W 84/18* (2009.01)

(56) References Cited

U.S. PATENT DOCUMENTS

| | | | |
|---|---|---|---|
| 9,232,307 | B2 | 1/2016 | Sherman et al. |
| 9,538,011 | B1 | 1/2017 | Sherman et al. |
| 10,061,769 | B2 | 8/2018 | Fujiwara et al. |
| 2007/0133435 | A1 | 6/2007 | Eneroth et al. |
| 2007/0263821 | A1* | 11/2007 | Shaffer ............. H04M 3/42187 379/202.01 |
| 2009/0298444 | A1 | 12/2009 | Shigeta |
| 2011/0078590 | A1* | 3/2011 | Hao ....................... G06Q 10/06 715/755 |
| 2011/0249073 | A1* | 10/2011 | Cranfill ................. H04N 7/147 348/14.02 |
| 2013/0275513 | A1* | 10/2013 | Borovyk ................ H04W 8/18 709/204 |
| 2014/0118597 | A1 | 5/2014 | Tabak et al. |
| 2015/0126169 | A1 | 5/2015 | Kerger et al. |
| 2015/0134322 | A1* | 5/2015 | Cuthbert ............... G06F 17/289 704/3 |
| 2015/0301796 | A1* | 10/2015 | Visser .................... G06F 3/167 715/728 |

FOREIGN PATENT DOCUMENTS

| | | |
|---|---|---|
| EP | 2974206 A1 | 1/2016 |
| ES | 2435518 T3 | 12/2013 |
| JP | 06-189002 A | 7/1994 |
| JP | 2012-146072 A | 8/2012 |
| JP | 2016-500891 A | 1/2016 |
| JP | 2016-522590 A | 7/2016 |
| JP | 2016-218995 A | 12/2016 |
| KR | 2016-0018457 A | 2/2016 |
| WO | 2005/043944 A1 | 5/2005 |
| WO | 2007/077873 A1 | 7/2007 |
| WO | 2014/164666 A1 | 10/2014 |

OTHER PUBLICATIONS

Florida, Young Grad Creates App That Turns a Cell Phone into a Microphone, New Jersey Institute of Technology, Sep. 2014, pp. 02.

Office Action for JP Patent Application No. 2018-126272, dated Jun. 26, 2019, 04 pages of Office Action and 04 pages of English Translation.

* cited by examiner

SYSTEM AND METHOD FOR CONTROLLING CLIENT ELECTRONIC DEVICES IN WIRELESS LOCAL AD HOC NETWORK

CROSS-REFERENCE TO RELATED APPLICATIONS/INCORPORATION BY REFERENCE

None.

FIELD

Various embodiments of the disclosure relate to wireless local ad hoc network and conferencing system technologies. More specifically, various embodiments of the disclosure relate to a system and method for controlling client electronic devices in a wireless local ad hoc network.

BACKGROUND

Typically, in public address systems, such as a conference, the discussion is followed by a question/answer round. The host or the moderator of the conference allows the participants, from the floor, to ask questions or express their viewpoints. While speaking, a participant may use a portable microphone to be properly audible to other participants. However, it may become quite cumbersome for the host of the conference to manage and prioritize the participants (associated with such portable electronic devices) in a limited time. Further, as the portable microphones is passed across the participants, it may result in undue waste of time. Thus, there is required an intelligent and platform-independent system that may control such portable electronic devices in a wireless local ad hoc network and provide the participants an enhanced and seamless experience as well.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for controlling client electronic devices in a wireless local ad hoc network are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
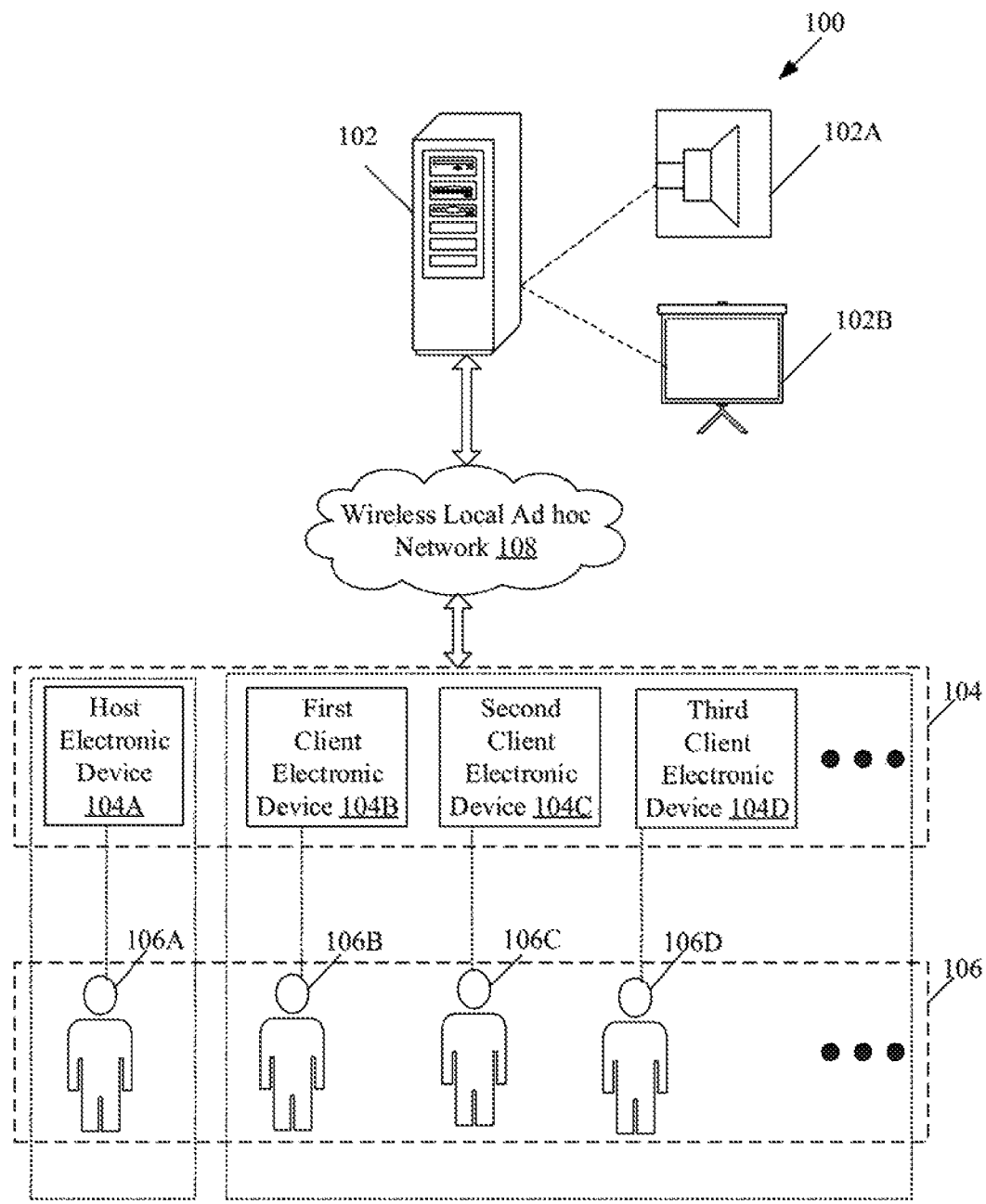
FIG. 1 illustrates an exemplary network environment for implementation of a system for controlling client electronic devices, in accordance with an embodiment of the disclosure.

Various implementations may be found in a system and method for controlling client electronic devices in a wireless local ad hoc network. Exemplary aspects of the disclosure may include a system that may include one or more circuits in a server communicatively coupled with a plurality of client electronic devices in a wireless local ad hoc network. Examples of the server may correspond to at least one of a speaker system, a television, or other electronic device. Examples of each of the plurality of client electronic devices may correspond to at least one of a smart phone, a laptop, or other portable electronic device. In accordance with an embodiment, the one or more circuits in the server may be configured to create the wireless local ad hoc network based on an application program.

The one or more circuits in the server may be configured to receive a plurality of speaking-slot requests from a plurality of client electronic devices for a presented content. Prior to the receipt of the plurality of speaking-slot requests, in accordance with an embodiment, the one or more circuits in the server may be configured to authorize the client electronic devices based on an analysis of the one or more image frames of associated users. The one or more circuits in the server may be configured to analyze the one or more image frames of the associated users based on at least face detection, emotion detection, or age estimation of the associated users. A selection of a client electronic device may be based on the authorization. In accordance with an embodiment, the one or more circuits in the server may be further configured to utilize one more image frames for false face detection. In other words, it may be determined whether a detected face of a user is correct or a false-positive. The false-positive related to face detection may be determined based on detected biological cues, such as eye blink, face movement, a movement of facial tissue, and the like The one or more circuits in the server may be configured to select the client electronic device based on acceptance of a corresponding speaking-slot request. The acceptance of the corresponding speaking-slot request may be done based on at least an analysis of one or more image frames of the user associated with the client electronic device and a context of the presented content. The acceptance of the corresponding speaking-slot request may be further based on a priority level of the user associated with the selected client electronic device. The one or more circuits in the server may be configured to set the priority level of the user based on a count of times of participation of the user associated with the client electronic device. In accordance with an exemplary embodiment, the one or more circuits in the server may be configured to reset the priority level of a plurality of users in accordance with first-come first-serve method. The first-come first-serve method may be considered due to an equal count of times of participation of each user associated with the client electronic device, or a similar analysis of a plurality of video clips of the plurality of users associated with the plurality of client electronic devices. Based on the selection, a circuitry of the selected client electronic device may be activated and noise cancellation may be performed for an audio stream.

The one or more circuits in the server may be further configured to receive at least the audio stream provided by the user from the selected client electronic device. In accordance with an embodiment, the one or more circuits in the server may be further configured to receive a video stream provided by the user from the selected client electronic device. The received video stream may be displayed the at a display device associated with the server. In accordance with an embodiment, the one or more circuits in the server may be configured to receive the audio stream and the video stream based on a defined position and orientation of the selected client electronic device held by the user. In accordance with an embodiment, the one or more circuits in the server may be configured to receive a text message, provided by the user, from the selected client electronic device. The text message may be provided by the user when a limited time duration is available with the user to provide the audio stream or the video stream, or a waiting time of the selected client electronic devices exceeds a threshold value.

In accordance with an embodiment, the one or more circuits in the server may be configured to translate a language of the text message or the audio stream into a defined language. The translated text message may be displayed at a display device associated with the server. The translated audio stream may be played back at an audio rendering device associated with the server.

The one or more circuits may be further configured to control the selected client electronic device, from which at least the audio stream is received, based on one or more parameters associated with at least the selected client electronic device. The one or more parameters may correspond to an input provided at a host electronic device that presents the content, a defined time limit for the user, a change in the position or orientation of the selected client electronic device, a change in a topic of the presented content, or a modified priority level of the user. In accordance with an embodiment, the one or more circuits in the server may be configured to connect with a new client electronic device from an external network.

FIG. 1 illustrates an exemplary network environment for implementation of a system for controlling client electronic devices. With reference to FIG. 1, there is shown an exemplary network environment 100 that may include a server 102, a plurality of client electronic devices 104, and a plurality of users 106. The plurality of client electronic devices 104 may include a host electronic device 104A and two or more client electronic devices, such as a first client electronic device 104B, a second client electronic device 104C, and a third client electronic device 104D. The plurality of users 106 may include a host user 106A and two or more users, such as a first user 106B, a second user 106C, and a third user 106D. Each of the plurality of users 106 may be associated with a corresponding client electronic device of the plurality of client electronic devices 104, as shown in FIG. 1. The server 102 may be associated with an audio rendering device 102A and a display device 102B. The server 102 may be communicatively coupled with the plurality of client electronic devices 104, via a wireless local ad hoc network 108. It may be noted that for exemplary purposes, there are shown only four client electronic devices and four users in the exemplary network environment 100. Notwithstanding, the disclosure may not be so limited, and the exemplary network environment 100 may include more than four client electronic devices and associated users, without deviation from the scope of the disclosure.

The server 102 may comprise suitable logic, circuitry, interfaces, and/or code that may be configured to communicate with the plurality of client electronic devices 104, via the wireless local ad hoc network 108. The server 102 may be implemented in a public address system, such as a conference, a meeting, a classroom, or other such gathering. The server 102 may be further configured to control the plurality of client electronic devices 104 based on one or more parameters associated with at least the plurality of client electronic devices 104. In accordance with an embodiment, the server 102 may comprise the audio rendering device 102A and the display device 102B. In accordance with another embodiment, the server 102 may be communicatively coupled with the audio rendering device 102A and the display device 102B, via the wireless local ad hoc network 108. Examples of the server may include, but are not limited to, a speaker system, a television, or other such electronic device.

Each of the plurality of client electronic devices 104 may comprise suitable logic, circuitry, interfaces, and/or code that may be configured to communicate with the server 102, via the wireless local ad hoc network 108. One of the plurality of client electronic devices 104 may be designated as a host electronic device 104A that may function as a host or a moderator to present content on one or more topics. Others of the plurality of client electronic devices 104 may transmit a plurality of speaking-slot requests, audio streams, video streams, and text messages to the server 102, via the wireless local ad hoc network 108. Examples of the plurality of client electronic devices 104 may include, but are not limited to, a smart phone, a tablet computer, a web-enabled device, a laptop, a wearable electronic device, and/or other such electronic device.

Each of the plurality of users 106 may correspond to an entity that handles a corresponding client electronic device from the plurality of client electronic devices 104. The entity may correspond to an owner, a moderator, a presenter, a host, a participant, a student, an attendee, or the like in the exemplary network environment 100. The host user 106A from the plurality of users 106 may correspond to a moderator or a presenter in the exemplary network environment 100. The host user 106A may use the host electronic device 104A to present content on one or more topics. Remaining two or more users, such as the first user 106B, the second user 106C, and the third user 106D of the plurality of users 106 may correspond to attendees, students, or participants in the exemplary network environment 100. The first user 106B, the second user 106C, and the third user 106D may use the first client electronic device 104B, the second client electronic device 104C, and the third client electronic device 104D, respectively, to request the speaking-slots, and provide audio streams, video streams, and text messages to the server 102, via the wireless local ad hoc network 108.

The wireless local ad hoc network 108 may include a wireless communication medium through which the server 102 may communicate with the plurality of client electronic devices 104. Examples of the wireless local ad hoc network 108 may include, but are not limited to, a Wireless Fidelity (Wi-Fi) network, a local ad hoc network, a wireless personal area network (WPAN), a Wireless Local Area Network (WLAN), and/or a Bluetooth network. Various devices in the exemplary network environment 100 may be configured to connect to the wireless local ad hoc network 108, in accordance with various wireless communication protocols.

In operation, the server 102 in the exemplary network environment 100 may be activated when switched on. Based on an execution of an application program, such as a web application, in a first mode, the server 102 may be configured to create the wireless local ad hoc network 108. Each of the plurality of users 106 associated with a client electronic device of the plurality of client electronic devices 104 may open an application browser, which corresponds to the application program, and provide a defined URL. A UI, similar to the exemplary UI illustrated in FIG. 4B, may appear on the display screen of the client electronic device. The UI may show a second mode option or a third mode option. The second mode may correspond to a "Host Mode" and the third mode may correspond to a "Client Mode".

One of the plurality of client electronic devices 104 may be designated as the host electronic device 104A and the corresponding user may be designated as the host user 106A based on selection of the second mode. The designation of the host electronic device 104A and corresponding exemplary UIs have been described in detail in FIGS. 3 and 4B to 4D.

The host user 106A may start with presentation of content, such as delivering a lecture on a specific topic, such as "Effect of movies on youth". During presentation of the content or at the end of the presentation, the host user 106A may want to initiate a questionnaire session, for which the host user 106A may enable the third mode for the two or more users, i.e. the first user 106B, the second user 106C, and the third user 106D.

Based on the created wireless local ad hoc network 108 and the enabled third mode, the URL may present a UI at the display screen of each of the two or more client electronic devices. The UI may present a local page in the application browser that may prompt the two or more users to select client mode at respective two or more client electronic devices. The exemplary UI has been illustrated in FIG. 4E.

Once the client mode is selected, the user may be instructed to hold the associated client electronic device in a defined position and orientation so that the client electronic device may capture one or more image frames of the user. The exemplary UI for providing assistance to the user has been illustrated in FIG. 4F. Each of the two or more client electronic devices may be configured to transmit the captured one or more image frames of the associated user of the two or more users to the server 102, via the wireless local ad hoc network 108, for authorization. The server 102 may be configured to analyze the one or more image frames of each of the two or more users based on at least face detection, emotion detection, or age estimation of the user. The server 102 may be configured to authorize a client electronic device based on the analysis of the received one or more image frames of the associated user.

When authorized, the UI may present next link page on the two or more client electronic devices. The next link page may include a plurality of selection buttons for a plurality of options, such as "Request for Speaking-Slot", "Initiate Audio/Video stream", "Type for Text Message", and the like. The exemplary UI has been illustrated in FIG. 4G.

Each of the two or more users may be prompted to select a first option, "Request for Speaking-Slot", at corresponding client electronic device of the two or more client electronic devices to request the server 102 for providing a speaking slot. Thereafter, each of the two or more client electronic devices may be configured to transmit the request for speaking-slot to the server 102, via the wireless local ad hoc network 108.

The server 102 may be configured to receive a speaking-slot request from each of the two or more client electronic devices for the content presented by the host user 106A. The server 102 may be further configured to determine the priority levels of the two or more users. In accordance with an embodiment, the server 102 may be configured to set the priority level of each of the two or more users based on a count of times of participation of the user associated with the client electronic device. In accordance with an embodiment, the server 102 may be configured to reset the priority level of each of the two or more users in accordance with first-come first-serve method. The first-come first-serve method may be considered due to an equal count of times of participation of each user associated with a client electronic device, or a similar analysis of one or more image frames of each user of the two or more users associated with the two or more client electronic devices.

Based on the analysis of the one or more image frames of each of the two or more users, context of the presented content, and the priority level of each of the two or more users, the server 102 may be configured to accept the speaking-slot request from one client electronic device, such as the first client electronic device 104B, of the two or more client electronic devices. Consequently, the server 102 may select the first client electronic device 104B. Based on the selection, the first client electronic device 104B may be activated to receive input from the associated user.

In response to the selection, the first user 106B may select the option "Initiate Audio/Video Stream." Accordingly, the first client electronic device 104B may instruct the associated user to again hold the respective client electronic device in the defined position and orientation. The instructions may be graphic-assisted or voice-assisted to guide the user, as illustrated in exemplary UI in FIG. 4F. In accordance with an embodiment, the first client electronic device 104B may be the only one device that has transmitted the request for the speaking-slot. In such case, the first client electronic device 104B may be immediately enabled to select the next options to initiate audio/video stream. In accordance with another embodiment, there may be other devices in a queue waiting for their turn to participate and initiate audio/video stream. In such case, the first client electronic device 104B may be added to the queue and when the turn of the first client electronic device 104B comes, one or more visual or tactile indicators may provide a reminder to the first user 106B before a defined time, such as "30 seconds." Once the defined time is lapsed, the first client electronic device 104B is activated to receive input from the associated user.

In accordance with an embodiment, the first user 106B may provide an audio stream from the selected first client electronic device 104B in case an image capturing device in the first client electronic device 104B is non-functional, manually disabled, or the battery level is insufficient. The audio stream may correspond to a spoken response of the first user 106B to the questionnaire raised by the host user 106A. The audio stream may be recorded based on a defined position and orientation at which the first client electronic device 104B is held by the first user 106B. The selected first client electronic device 104B may be configured to transmit the recorded audio stream to the server 102, via the wireless local ad hoc network 108. The audio rendering device 102A associated with the server 102 may be configured to playback the received audio stream. In accordance with an embodiment, the first user 106B may provide the audio stream in a language different from the common language of the exemplary network environment 100. In such a case, the server 102 may be configured to translate the language of the audio stream to the common language and communicate the translated audio stream to the audio rendering device 102A. The audio rendering device 102A may be further configured to playback the translated audio stream. In accordance with an embodiment, the server scheduling server 102 may be further configured to detect language and convert the detected language to a basic language of speech for language translation. The audio rendering device 102A associated with the server 102 may be configured to playback an audio stream in the converted language.

In accordance with an embodiment, the first user 106B may provide an audio stream and a video stream from the selected first client electronic device 104B. The audio stream, as described above, may correspond to a spoken response of the first user 106B to the questionnaire raised by the host user 106A. The video stream may correspond to a plurality of image frames of the first user 106B captured in real-time by the associated first client electronic device 104B. The audio stream may be recorded and the video stream may be captured based on a defined position and orientation at which the first client electronic device 104B is held by the first user 106B. The selected first client electronic device 104B may be configured to transmit the recorded audio stream and the captured video stream to the server 102, via the wireless local ad hoc network 108. The audio rendering device 102A associated with the server 102 may be configured to playback the received audio stream. The display device 102B associated with the server 102 may be configured to display the received video stream.

In accordance with an embodiment, the first user 106B may provide a text message from the selected first client electronic device 104B. The text message may be provided by the first user 106B when a limited time duration is available with the first user 106B to provide the audio stream or the video stream, or a waiting time of the selected first client electronic device 104B exceeds a threshold value in case of a long queue. The display device 102B associated with the server 102 may be configured to display the received text message. In accordance with an embodiment, the first user 106B may provide the text message in a language different from the common language, for example, default language, such as English, of the exemplary network environment 100. In such a case, the server 102 may be configured to translate the language of the text message to the common language and communicate the translated text message to the display device 102B. The display device 102B may be further configured to display the translated text message.

The server 102 may be configured to control the first client electronic device 104B, from which the audio stream, the video stream, or the text message is received, based on one or more parameters associated with at least the selected client electronic device. The one or more parameters may correspond to an input provided at the host electronic device 104A, a defined time limit for the first user 106B, a change in a position or an orientation of the first client electronic device 104B, a change in a topic of the presented content, or a modified priority level of the first user 106B.

Figure 2:
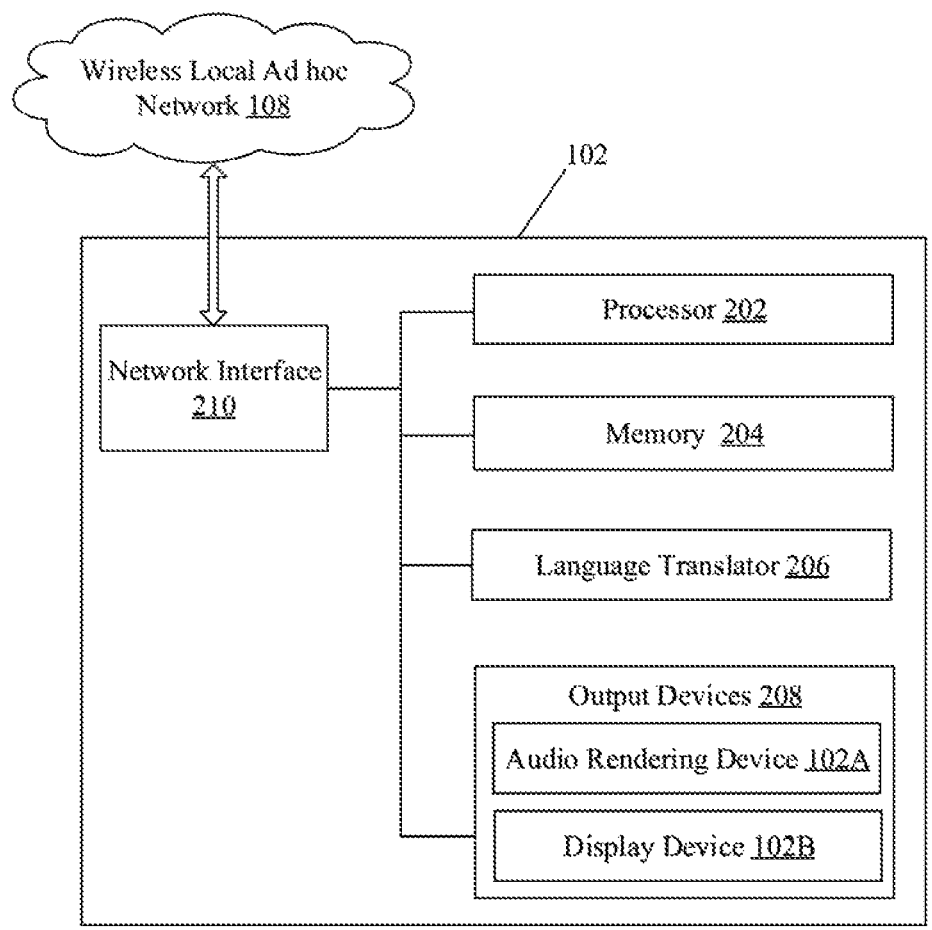
FIG. 2 is a block diagram that illustrates a server for controlling client electronic devices in a wireless local ad hoc network, in accordance with an embodiment of the disclosure.

FIG. 2 is a block diagram that illustrates a server for controlling client electronic devices in a wireless local ad hoc network, in accordance with an embodiment of the disclosure. With reference to FIG. 2, there is shown the server 102 that may include one or more processors or circuits, such as a processor 202, a memory 204, a language translator 206, output devices 208, and a network interface 210. The output devices 208 may include the audio rendering device 102A and the display device 102B. There is also shown the wireless local ad hoc network 108 (of FIG. 1).

In accordance with an embodiment, the processor 202, the memory 204, the language translator 206, the output devices 208, and the network interface 210 may be communicatively coupled with each other. The network interface 210 may be configured to communicate with the plurality of client electronic devices 104, via the wireless local ad hoc network 108, under the control of the processor 202.

The processor 202 may be a special-purpose hardware processor that may comprise suitable logic, circuitry, interfaces, and/or code that may be configured to process and analyze one or more image frames received from each of the plurality of client electronic devices 104. The processor 202 may be further configured to determine a priority level, set the priority level, or reset the priority level for each user associated with a corresponding client electronic device. In some embodiments, the processor 202 may be configured to execute a set of instructions stored in the memory 204. Examples of the processor 202 may be an Application-Specific Integrated Circuit (ASIC) processor, a Complex Instruction Set Computing (CISC) processor, and/or other image/video processors or control circuits.

The memory 204 may comprise suitable logic, circuitry, interfaces, and/or code that may be configured to store a set of instructions executable by the processor 202. The memory 204 may be configured to store one or more image processing algorithms, video processing algorithms, text processing algorithms, intelligence algorithms, and machine learning algorithms, that are executed by the processor 202 to process the image frames or the video streams received from the plurality of client electronic devices 104. The memory 204 may be further configured to store operating systems and associated application programs to implement a public address system. Examples of implementation of the memory 204 may include, but are not limited to, Read Only Memory (ROM), Random Access Memory (RAM), Dynamic Random Access Memory (DRAM), Static Random Access Memory (SRAM), Thyristor Random Access Memory (T-RAM), Zero-Capacitor Random Access Memory (Z-RAM), cache memory, volatile memory, a flash memory, Hard Disk Drive (HDD), a Solid-State Drive (SSD), and/or a removable media drive.

The language translator 206 may comprise suitable logic, circuitry, interfaces, and/or code that may be configured to perform translation of an audio stream or a text message from a first language to a second language. The first language may correspond to a language in which the audio stream or the text message is provided by a user associated with a client electronic device. The second language may correspond to a language that may be common amongst other users associated with respective client electronic devices. The language translator 206 may be realized based on various machine translation approaches, such as rule-based machine translation, statistical machine translation, example-based machine translation, hybrid machine translation, neural machine translation, and the like.

The output devices 208 may comprise suitable logic, circuitry, interfaces, and/or code that may be operable to provide a text, image, video, or audio output. The output devices 208 may comprise various devices that may be operable to communicate with the processor 202. Examples of the output devices may include, but are not limited to, the audio rendering device 102A (such as a speaker system) and the display device 102B (such as a projector screen).

The network interface 210 may comprise suitable logic, circuitry, interfaces, and/or code that may be configured to communicate with the plurality of client electronic devices 104, via the wireless local ad hoc network 108. The network interface 210 may be implemented by use of known technologies to support wired or wireless communication of the server 102 with the wireless local ad hoc network 108. Components of the network interface 210 may include, but are not limited to, an antenna, a radio frequency (RF) transceiver, one or more amplifiers, a tuner, one or more oscillators, a digital signal processor, a coder-decoder (CO-DEC) chipset, a subscriber identity module (SIM) card, and/or a local buffer.

In operation, the server 102 in the exemplary network environment 100 may be activated when power is switched on. Based on an execution of an application program, such as a web application, in a first mode, the processor 202 may be configured to create the wireless local ad hoc network 108.

The processor 202 may be configured to receive one or more image frames from each of the two or more client electronic devices. The one or more image frames may correspond to each user of the two or more users associated with the two or more client electronic devices. The processor 202 may be configured to perform an analysis of the one or more image frames of each user based on one or more intelligence or machine learning algorithms, for example face detection, emotion detection, or age estimation, retrieved from the memory 204. Such an analysis may enable the processor 202 to avoid display of false or invalid images on the display device 102B and authorize the two or more client electronic devices.

The processor 202 may be further configured to receive speaking-slot requests from the authorized two or more client electronic devices, via the network interface 210, for the content presented by the host user 106A. The processor 202 may be configured to determine the priority levels of the two or more users. In accordance with an embodiment, the processor 202 may be configured to set the priority level of each of the two or more users based on a count of times of participation of the user associated with the client electronic device. In accordance with an embodiment, the processor 202 may be configured to reset the priority level of each of the two or more users in accordance with first-come first-serve method. The first-come first-serve method may be considered due to an equal count of times of participation of each user associated with a client electronic device, or a similar analysis of one or more image frames of each user of the two or more users associated with the two or more client electronic devices.

Based on the analysis of the one or more image frames of each of the two or more users, context of the presented content, and the priority level of each of the two or more users, the processor 202 may be configured to accept the speaking-slot request from one client electronic device, such as the first client electronic device 104B, of the two or more client electronic devices. Accordingly, the processor 202 may maintain a queue of two or more client electronic devices. Consequently, the processor 202 may select the first client electronic device 104B. Based on the selection, the first client electronic device 104B may be activated to receive input from the associated user.

For example, the processor 202 may receive the speaking-slot request from only one device, i.e. the first client electronic device 104B. In such case, the processor 202 may immediately enable the first client electronic device 104B to select the next option to initiate audio/video stream to participate. In accordance with another embodiment, the processor 202 may receive the speaking-slot request from other devices, such as the second client electronic device 104C and the third client electronic device 104D, before the first client electronic device 104B. In such a case, the processor 202 maintains the queue based on first-come first-serve method. Thus, the first client electronic device 104B may have to wait for its turn to participate and initiate audio/video stream. In one instance, the processor 202 may remind the first user 106B of its turn based on one or more visual or tactile indicators before a defined time, such as "30 seconds." Once the defined time is lapsed, the first client electronic device 104B is activated to receive input from the first user 106B. In one instance, the processor 202 may receive a text message from the first client electronic device 104B in case the first client electronic device 104B is unable to wait for its turn.

In accordance with an embodiment, the processor 202 may be configured to receive a recorded audio stream from the selected first client electronic device 104B, via the network interface 210. The audio rendering device 102A may be configured to playback the received audio stream. In accordance with an embodiment, the first user 106B may provide the audio stream in a language different from the common language of the exemplary network environment 100. In such a case, the language translator 206 may be configured to translate the language of the audio stream to the common language and communicate the translated audio stream to the audio rendering device 102A. The audio rendering device 102A may be further configured to playback the translated audio stream.

In accordance with an embodiment, the processor 202 may be configured to receive a recorded audio stream and a captured video stream from the selected first client electronic device 104B, via the network interface 210. The audio stream, as described above, may correspond to a spoken response of the first user 106B to the questionnaire raised by the host user 106A. The video stream may correspond to a plurality of image frames of the first user 106B captured in real-time by the associated first client electronic device 104B. The audio stream may be recorded and the video stream may be captured based on a defined position and orientation at which the first client electronic device 104B is held by the first user 106B. The audio rendering device 102A may be configured to playback the received audio stream. The display device 102B may be configured to display the received video stream.

In accordance with an embodiment, the processor 202 may be configured to receive a text message from the selected first client electronic device 104B, via the network interface 210. The text message may be provided by the first user 106B when a limited time duration is available with the first user 106B to provide the audio stream or the video stream, or a waiting time of the selected first client electronic device 104B exceeds a threshold value in case of a long queue. The display device 102B may be configured to display the received text message. In accordance with an embodiment, the first user 106B may provide the text message in a language different from the common language of the exemplary network environment 100. In such a case, the language translator 206 may be configured to translate the language of the text message to the common language and communicate the translated text message to the display device 102B. The display device 102B may be further configured to display the translated text message.

Figure 4A:
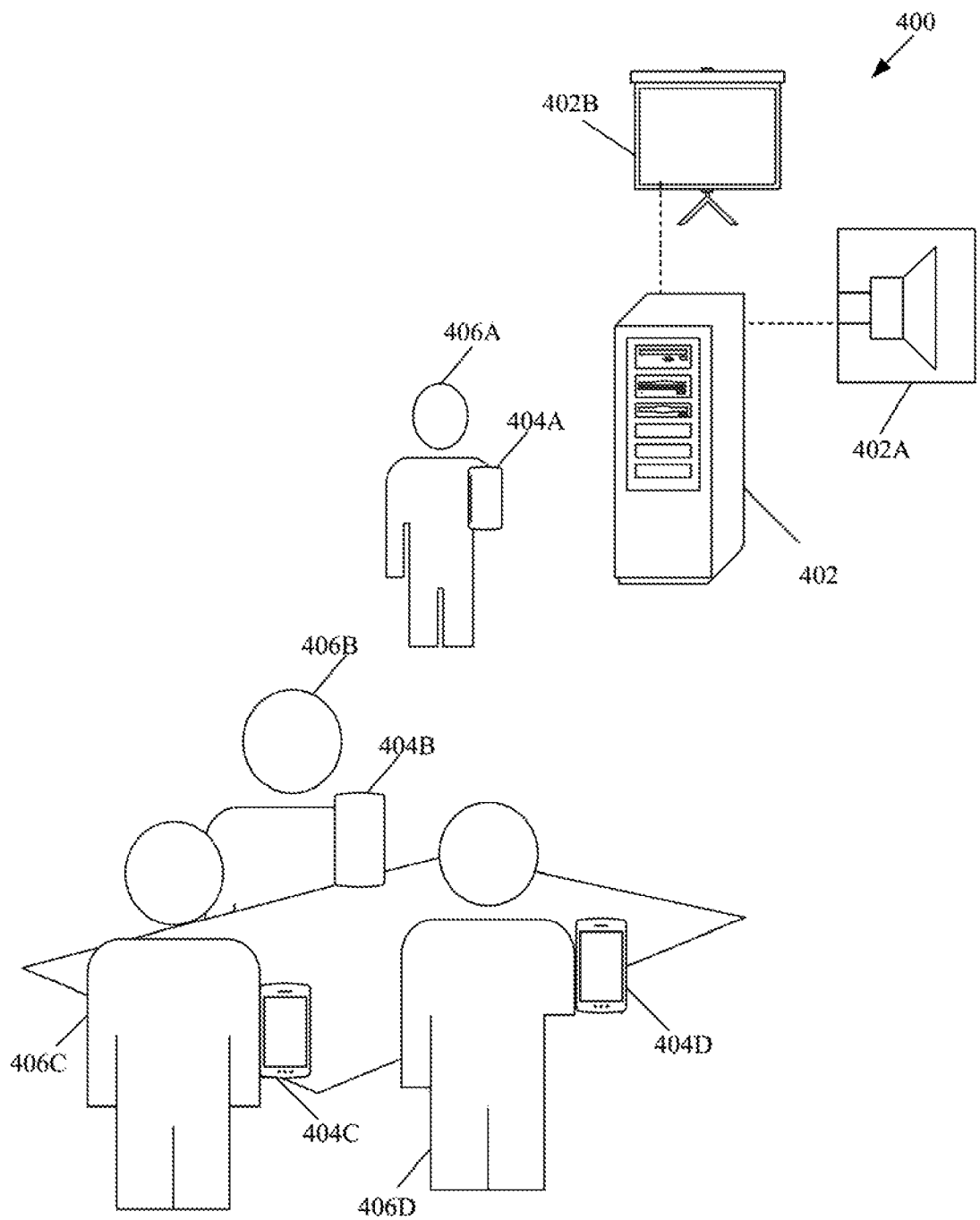
FIG. 4A illustrates an exemplary scenario for implementation of a system for controlling client electronic devices in a wireless local ad hoc network, in accordance with an embodiment of the disclosure.
Figure 4B:
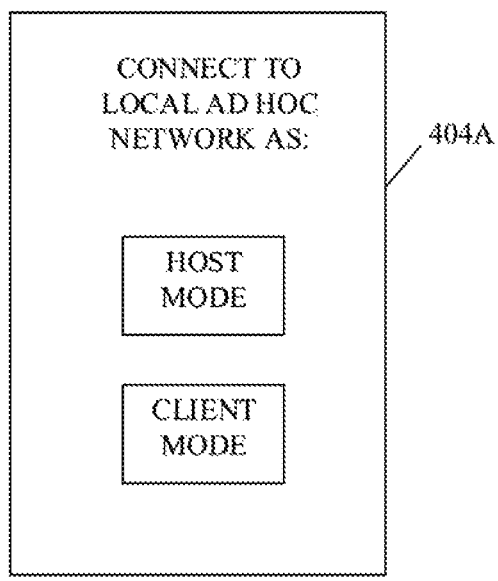
FIGS. 4B to 4H illustrate various exemplary user interfaces (UIs) displayed on various devices in a system for controlling client electronic devices in a wireless local ad hoc network, in accordance with an embodiment of the disclosure.
Figure 4C:
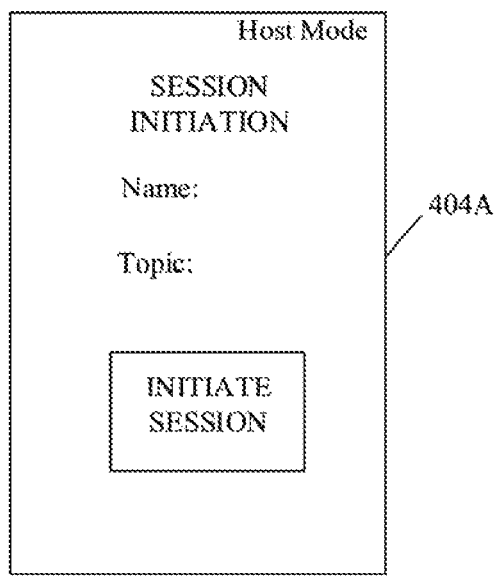
Figure 4D:
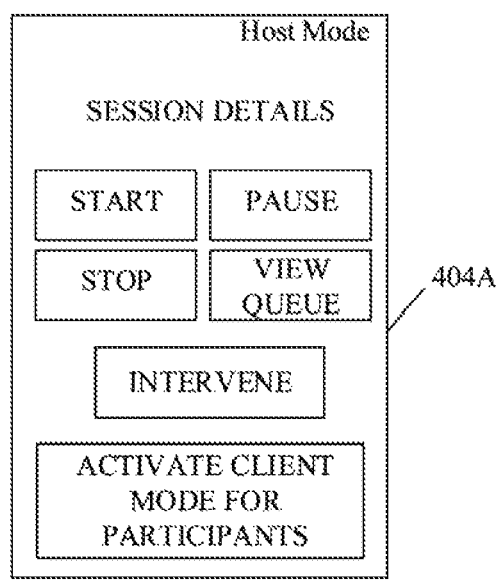
Figure 4E:
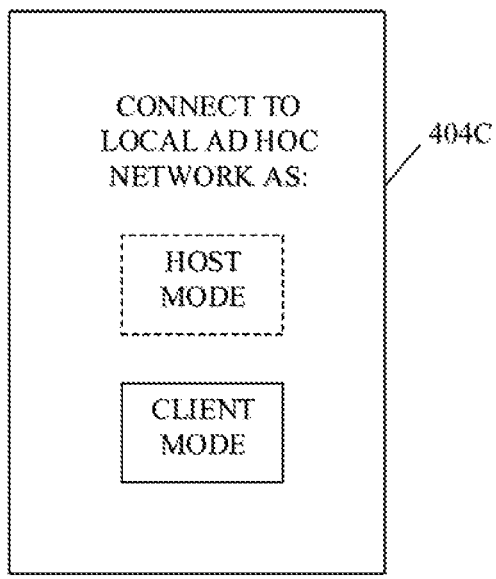
Figure 4F:
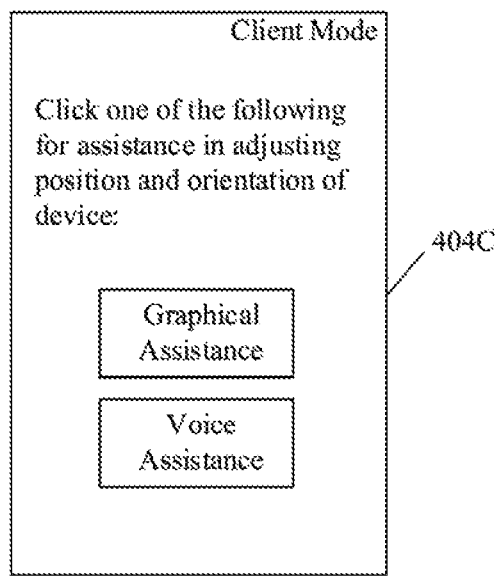
Figure 4G:
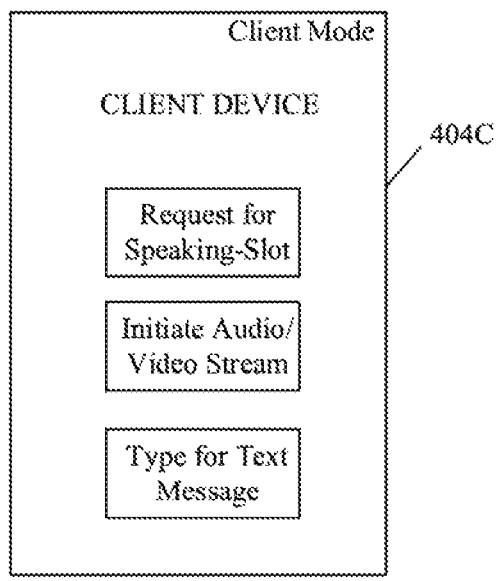
Figure 4H:
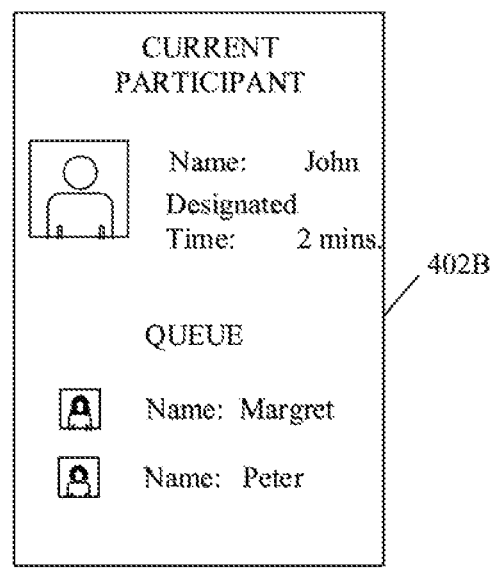

In addition to displaying the received one or more image frames, video streams, and text messages of a current user, the display device 102B may be further configured to display other content, such as an image and name of current user and one or more images and names of other users in the queue waiting for their turn, as illustrated in an exemplary UI in FIG. 4H. Such additional content may be displayed at the display device 102B at defined time intervals.

The processor 202 may be further configured to control the first client electronic device 104B, from which the audio stream, the video stream, or the text message is received, based on one or more parameters. The one or more parameters may correspond to an input provided at the host electronic device 104A, a defined time limit for the first user 106B, a change in a position or an orientation of the first client electronic device 104B, a change in a topic of the presented content, or a modified priority level of the first user 106B.

Figure 3:
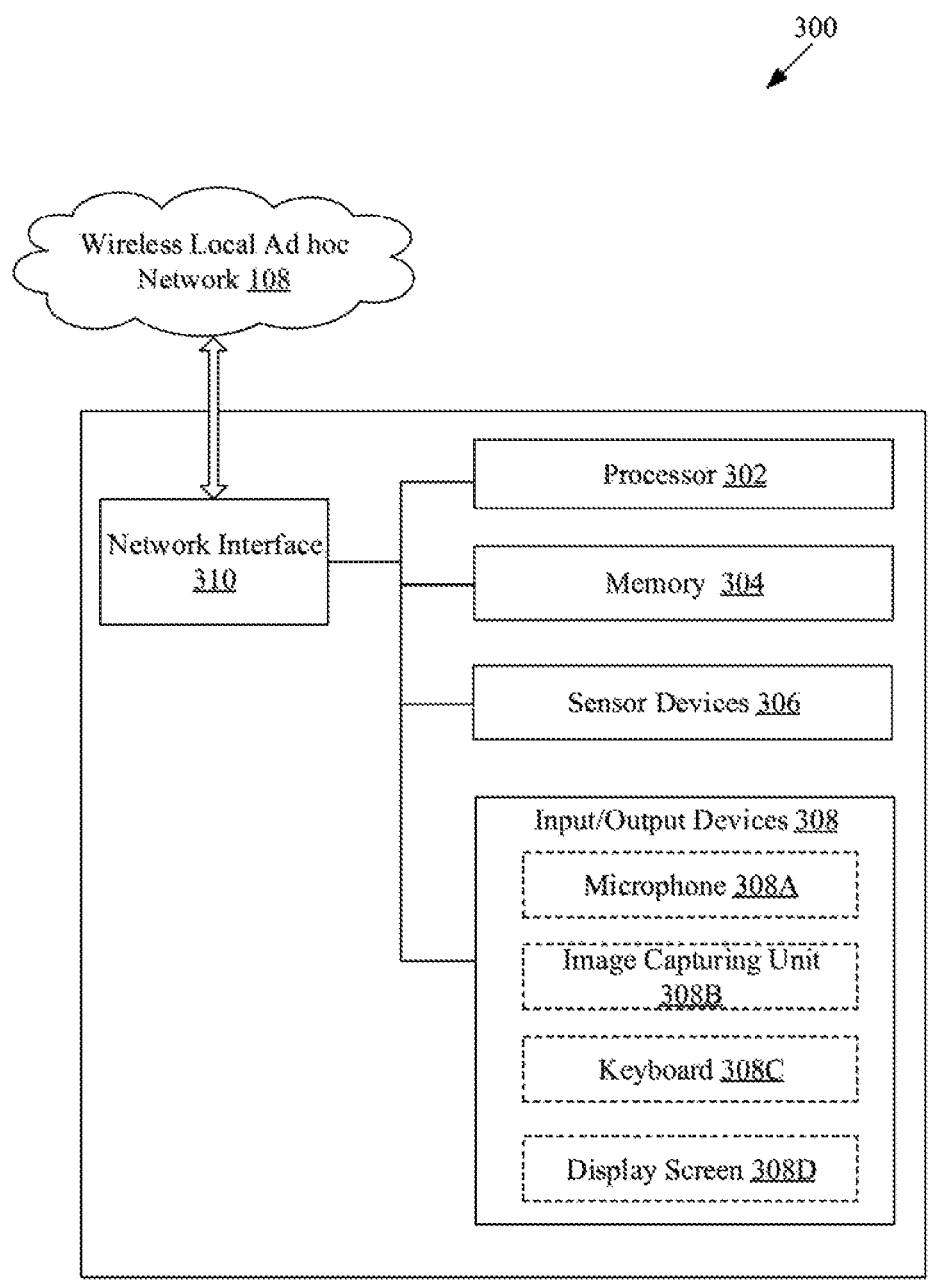
FIG. 3 is a block diagram that illustrates a client electronic device in a system for controlling client electronic devices in a wireless local ad hoc network, in accordance with an embodiment of the disclosure.

FIG. 3 is a block diagram that illustrates a client electronic device in a system for controlling client electronic devices in a wireless local ad hoc network, in accordance with an embodiment of the disclosure. With reference to FIG. 3, there is shown a client electronic device 300 that may include one or more processors or circuits, such as a processor 302, a memory 304, a plurality of sensor devices 306, input/output devices 308, and a network interface 310. The input/output devices 308 may include a microphone 308A, an image capturing unit 308B, a keyboard 308C, and a display screen 308D. There is also shown the wireless local ad hoc network 108 (of FIG. 1).

It may be noted that, in accordance with another embodiment, the client electronic device 300 may correspond to the host electronic device 104A, when the selected mode is the "Host Mode." In accordance with another embodiment, when the selected mode is the "Client Mode," the client electronic device 300 may correspond to each of the remaining two or more client electronic devices, such as the first client electronic device 104B, the second client electronic device 104C, and the third client electronic device 104D.

In accordance with an embodiment, the processor 302, the memory 304, the plurality of sensor devices 306, the input/output devices 308, and the network interface 310 may be communicatively coupled with each other. The network interface 310 may be configured to communicate with the server 102, via the wireless local ad hoc network 108, under the control of the processor 302.

The processor 302 may be a special-purpose hardware processor that may comprise suitable logic, circuitry, interfaces, and/or code that may be configured to execute a set of instructions stored in the memory 304. Examples of the processor 302 may be an Application-Specific Integrated Circuit (ASIC) processor, a Complex Instruction Set Computing (CISC) processor, and/or other image/video processors or control circuits.

The memory 304 may comprise suitable logic, circuitry, interfaces, and/or code that may be configured to store a set of instructions executable by the processor 302. The memory 304 may be further configured to store operating systems and associated application programs to implement the public address system. Examples of implementation of the memory 304 may include, but are not limited to, Read Only Memory (ROM), Random Access Memory (RAM), Dynamic Random Access Memory (DRAM), Static Random Access Memory (SRAM), Thyristor Random Access Memory (T-RAM), Zero-Capacitor Random Access Memory (Z-RAM), cache memory, volatile memory, a flash memory, Hard Disk Drive (HDD), a Solid-State Drive (SSD), and/or a removable media drive.

The plurality of sensor devices 306 may comprise suitable logic, circuitry, interfaces, and/or code that may be configured to detect a plurality of characteristics, such as position and orientation, of the client electronic device 300. The plurality of sensor devices 306 may be further configured to detect human faces, motion values, and/or depth values, of a user associated with the client electronic device 300. The plurality of sensor devices 306 may further comprise one or more sensors to aid in capture of the one or more image frames (as still images and/or video streams) of the user by an image-capturing unit. Examples of the one or more sensors may include, but are not limited to, a human face detection sensor, a motion sensor, a depth sensor, an accelerometer, a global positioning system (GPS) sensor, a compass or magnetometer, an ambient light sensor, a tricorder, a gyroscope, a proximity sensor, an image sensor, a lux meter, a touch sensor, and/or an infrared sensor.

The input/output devices 308 may comprise suitable logic, circuitry, interfaces, and/or code that may be operable to receive an input provided by the user or provide an output to the user. The input/output devices 308 may comprise various devices that may be operable to communicate with the processor 302. Examples of the input devices may include, but are not limited to, the microphone 308A, the image capturing unit 308B, and the keyboard 308C. Examples of the output devices may include, but are not limited to, the display screen 308D.

The network interface 310 may comprise suitable logic, circuitry, interfaces, and/or code that may be configured to communicate with the server 102, via the wireless local ad hoc network 108 (of FIG. 1). The network interface 310 may be implemented by use of known technologies to support wired or wireless communication of the client electronic device 300 with the wireless local ad hoc network 108. Components of the network interface 310 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

In operation, based on an execution of an application program, such as a web application, in a first mode, the server 102 may be configured to create the wireless local ad hoc network 108. Accordingly, a user associated with the client electronic device 300 may open an application browser and provide a defined URL. A UI, similar to the exemplary UI illustrated in FIG. 4B, may appear on the display screen 308D. The user may select one of the two options "Host Mode" or "Client Mode" displayed on the display screen 308D.

In accordance with a first aspect of the disclosure, the client electronic device 300 may be designated as the host electronic device 104A and the corresponding user may be designated as the host user 106A, based on execution of the application program in a second mode, i.e. the "Host Mode". In such a case, the client electronic device 300 (designated as the host electronic device 104A) may be utilized by the host user 106A to present content, such as delivering a lecture on a specific topic. Once the client electronic device 300 is designated as the host electronic device 104A, the option "Host Mode" may be disabled for all other users, as only one host is permitted in the public address system.

Once designated, the host electronic device 104A may initiate a session based on at least name and topic of presentation provided by the host user 106A, as illustrated in exemplary UI in FIG. 4C. Thereafter, the host user 106A may start with the presentation, pause or stop the presentation at any time instant, activate client mode for participants, view queue, or intervene a participant, based on various options, as illustrated in exemplary UI in FIG. 4D. During presentation of the content or at the end of the presentation, the host user 106A may want to initiate a questionnaire session, for which the host user 106A may enable a third mode, i.e. the "Client Mode," for the two or more client electronic devices. Accordingly, the two or more users, such as the first user 106B, the second user 106C, and the third user 106D, of the plurality of users 106 may be enabled to open application browsers in respective two or more client electronic devices and select the "Client Mode."

In accordance with an embodiment, the processor 302 of the client electronic device 300 (designated as the host electronic device 104A) may be configured to display the names and images of the two or more users on the display screen 308D. The names and images of the two or more users may be displayed based on the received requests for speaking-slot from the two or more client electronic devices.

In accordance with an embodiment, the processor 302 of the client electronic device 300 (designated as the host electronic device 104A) may be configured to control the two or more users. For example, the host user 106A may override the automatic selection of a user, such as the first user 106B, by the server 102 by manually selecting another user, such as the second user 106C, as a first participant. In another example, the host user 106A may manually increase the priority level of the other user, such as the second user 106C, so that the other user is selected as a first participant by the server 102.

In accordance with a second aspect of the disclosure, the client electronic device 300 may be designated as each of the two or more client electronic devices, such as the first client electronic device 104B, the second client electronic device 104C, or the third client electronic device 104D, based on selection of the "Client Mode." In such a case, the client electronic device 300 (designated as each of the two or more client electronic devices) may be utilized by the associated user to act as a participant in the public address system. The "Client Mode" is selectable by the client electronic devices when the host user 106A enables the same option for a questionnaire session, as an example.

Once the client mode is selected, the processor 302 in conjunction with the plurality of sensor devices 306, may instruct the user to hold the associated client electronic device in a defined position and orientation so that the client electronic device may capture one or more image frames of the user. The processor 302 of the client electronic device 300 (designated as each of the two or more client electronic devices) may be configured to transmit the captured one or more image frames of the associated user to the server 102, via the network interface 310 and the wireless local ad hoc network 108, for authorization. The server 102 may authorize or not authorize (decline) the client electronic device based on analysis of the one or more image frames of the user received from the client electronic device.

Accordingly, the processor 302 of the client electronic device 300 (designated as each of the two or more client electronic devices) may receive a message, such as "Not Authorized", in case of unsuccessful authorization, or another message, such as "Authorized", in case of successful authorization, from the server 102, via the network interface 310 and the wireless local ad hoc network 108. In case of the message, such as "Not Authorized", the client electronic device 300 (designated as each of the two or more client electronic devices) may not be able to participate in the public address system. However, in case of the other message, such as "Authorized", the client electronic device 300 (designated as each of the two or more client electronic devices) may be able to participate in the public address system. Upon authorization, the UI of the client electronic device 300 (designated as each of the two or more client electronic devices) may present next link page that may include a plurality of selection buttons for a plurality of options, such as "Request for Speaking-Slot", "Initiate Audio/Video stream", "Type for Text Message", and the like. In some embodiments, a total time limit may be specified for the question and answer session for a specified number of users. In some embodiments, if the operations related to the question and answer session is completed before the specified total time limit, for example, if 10 percent of additional time of the total time limit is remaining, another user(s) may be provided speaking slots in the remaining time.

Each of the two or more users may be prompted to select the first option, "Request for Speaking-Slot", at respective two or more client electronic devices to request the server 102 for a speaking slot. The processor 302 of the client electronic device 300 (designated as each of the two or more client electronic devices) may be configured to transmit the request for speaking-slot to the server 102, via the network interface 310 and the wireless local ad hoc network 108.

The server 102 may be configured to analyze the one or more image frames of each of the two or more users based on at least face detection, emotion detection, or age estimation of the user. The server 102 may be configured to determine the priority levels of the two or more users. In accordance with an embodiment, the server 102 may be configured to set the priority level of each of the two or more users based on a count of times of participation of the user associated with the client electronic device 300 (designated as each of the two or more client electronic devices). In accordance with an embodiment, the server 102 may be configured to reset the priority level of each of the two or more users in accordance with first-come first-serve method. The first-come first-serve method may be considered due to an equal count of times of participation of each user associated with the client electronic device 300 (designated as each of the two or more client electronic devices), or a similar analysis of one or more image frames of each user associated with the client electronic device 300 (designated as each of the two or more client electronic devices) with other users. In accordance with an embodiment, the server 102 may be configured to reset the priority level of each of the two or more users in accordance with image analysis and profile analysis of the corresponding user. For example, the server 102 may reset the priority for a user who is a senior citizen and related to the field of discussion.

Based on the analysis of the one or more image frames of each of the two or more users, context of the presented content, and the priority level of each of the two or more users, speaking-slot request from the client electronic device 300 (designated, for example, as the first client electronic device 104B), may be accepted by the server 102. Consequently, the client electronic device 300 (designated, for example, as the first client electronic device 104B) may be selected by the server 102. Accordingly, the client electronic device 300 (designated, for example, as the first client electronic device 104B) may be activated to receive input from the associated user, i.e. the first user 106B.

Consequently, in response to the selection of the second option, "Initiate Audio/Video Stream", each of the two or more client electronic devices, based on the respective plurality of sensor devices, may instruct the associated user to hold the respective client electronic device in a defined position and orientation. The instructions may be graphic-assisted or voice-assisted to guide the two or more users. Further, a haptic indication, such as a vibration, may be added before the graphics assistant to seek attention of the two or more users. Thus, each of the two or more client electronic devices is held by the associated user of the two or more users in the defined position and orientation.

In accordance with an embodiment, the first user 106B may provide an audio stream at the microphone 308A of the client electronic device 300 (designated, for example, as the first client electronic device 104B). In such a case, the video stream may not be captured due to one or more reasons. For example, the image capturing device is manually disabled, the image capturing device is non-functional, or the battery is low. The audio stream may be recorded based on a defined position and orientation at which the client electronic device 300 (designated, for example, as the first client electronic device 104B) is held by the first user 106B. The audio stream may be stopped or paused based on a defined position and orientation at which the client electronic device 300 (designated, for example, as the first client electronic device 104B) is held by the first user 106B. Such a control of the audio stream, based on the defined position and orientation of the client electronic device 300 (designated, for example, as the first client electronic device 104B), may facilitate cancellation of background noise, and enhance user experience.

The selected client electronic device 300 (designated, for example, as the first client electronic device 104B) may be configured to transmit the recorded audio stream to the server 102, via the network interface 310 and the wireless local ad hoc network 108. The audio rendering device 102A associated with the server 102 may be configured to playback the received audio stream. In accordance with an embodiment, the first user 106B may provide the audio stream in a language different from the common language of the exemplary network environment 100. In such a case, the server 102 may be configured to translate the language of the audio stream to the common language and communicate the translated audio stream to the audio rendering device 102A. The audio rendering device 102A may be further configured to playback the translated audio stream.

In accordance with an embodiment, the first user 106B may provide an audio stream and a video stream at the microphone 308A and the image capturing unit 308B, respectively, of the selected client electronic device 300 (designated, for example, as the first client electronic device 104B). The audio stream, as described above, may correspond to a spoken response of the first user 106B to the questionnaire raised by from the host user 106A. The video stream may correspond to a plurality of image frames of the first user 106B captured in real-time by the associated client electronic device 300 (designated, for example, as the first client electronic device 104B). The audio stream may be recorded and the video stream may be captured based on a defined position and orientation at which the client electronic device 300 (designated, for example, as the first client electronic device 104B) is held by the first user 106B. The recording of the audio stream and the capturing of the video stream may be stopped or paused based on a defined position and orientation at which the client electronic device 300 (designated, for example, as the first client electronic device 104B) is held by the first user 106B. The selected client electronic device 300 (designated, for example, as the first client electronic device 104B) may be configured to transmit the recorded audio stream and the captured video stream to the server 102, via the network interface 310 and the wireless local ad hoc network 108. The audio rendering device 102A associated with the server 102 may be configured to playback the received audio stream. The display device 102B associated with the server 102 may be configured to display the received video stream.

In accordance with an embodiment, the first user 106B may provide a text message at the keyboard 308C of the selected client electronic device 300 (designated, for example, as the first client electronic device 104B). The text message may be provided by the first user 106B when a limited time duration is available with the first user 106B to provide the audio stream or the video stream, or a waiting time of the selected client electronic device 300 (designated, for example, as the first client electronic device 104B) exceeds a threshold value in case of a long queue. The display device 102B associated with the server 102 may be configured to display the received text message. In accordance with an embodiment, the first user 106B may provide the text message in a language different from the common language of the exemplary network environment 100. In such a case, the server 102 may be configured to translate the language of the text message to the common language and communicate the translated text message to the display device 102B. The display device 102B may be further configured to display the translated text message.

FIG. 4A illustrates an exemplary scenario for implementation of the disclosed system for controlling client electronic devices in a wireless local ad hoc network, in accordance with an embodiment of the disclosure. FIG. 4A has been described in conjunction with exemplary UIs illustrated in FIGS. 4B to 4H. With reference to FIG. 4A, there is shown a meeting room 400, which may correspond to the exemplary network environment 100 (of FIG. 1). The meeting room 400 may include a smart electronic device 402, a plurality of smart phones 404, and a plurality of participants 406, which may respectively correspond to the server 102, the plurality of client electronic devices 104, and the plurality of users 106, as described in FIG. 1. The plurality of participants 406 may include a presenter 406A, a first participant 406B, a second participant 406C, and a third participant 406D. The presenter 406A, the first participant 406B, the second participant 406C, and the third participant 406D may be associated with a host smart phone 404A, a first smart phone 404B, a second smart phone 404C, and a third smart phone 404D, respectively. There are further shown a speaker system 402A and a projector screen 402B associated with the smart electronic device 402.

With reference to FIG. 4A, in the meeting room 400, the smart electronic device 402 is activated when switched on. A web application in the smart electronic device 402 is executed in a first mode, based on which the smart electronic device 402 enters the first mode, i.e. the "Server Mode". Consequently, the smart electronic device 402 creates a wireless local ad hoc network in the meeting room 400.

Each participant may enter a defined URL in an application browser in associated smart phone. The URL presents a UI at the display screen of the each smart phone. The UI further presents a local page in the application browser that prompts the participants to initiate one of a "Host Mode" or a "Client Mode", as illustrated in FIG. 4B.

One of the participants in the meeting room 400 may want to initiate the meeting, with the topic of discussion "Knowledge Sharing Session on Latest Case Laws". The participant selects the "Host Mode" and is consequently designated as the presenter 406A. Thereafter, the option "Host Mode" is disabled and no other participant can select the "Host Mode" for the meeting thereafter until the presenter 406A exits the "Host Mode".

The UI further presents a next page wherein the presenter 406A provides at least name and topic of presentation, for example "Knowledge Sharing Session on Latest Case Laws", and initiates a session, as illustrated in FIG. 4C. Thereafter, the presenter 406A starts with presentation on the topic "Knowledge Sharing Session on Latest Case Laws", and selects the option "START", as illustrated in FIG. 4D. The presenter 406A may further pause or stop the presentation at any time instant, based on the selection of the corresponding options "PAUSE" and "STOP", as illustrated in FIG. 4D. At the end of the presentation, the presenter 406A may want to initiate a question/answer session, for which the presenter 406A selects an option "ACTIVATE CLIENT MODE FOR PARTICIPANTS" in the application program, as illustrated in FIG. 4D. Consequently, the "Client Mode" is enabled at the two or more smart phones (of the plurality of smart phones 404) the other participants in the meeting room 400.

In an exemplary implementation, the UI may further include a display portion, in which a list of participants may be displayed, when the presenter 406A selects an option "VIEW QUEUE". The displayed list may include at least images and names of the participants in queue, which may be created by the smart electronic device 402. In an instance, the presenter 406A may wish to select the option "INTERVENE" in the application program, as illustrated in FIG. 4D, to select another participant. The presenter 406A may select the option "INTERVENE" based on the discretion of the presenter 406A to change the priority of the participant in the queue. Alternatively, the presenter 406A may select the option "INTERVENE" based on an immediate request received from the participant waiting in the queue. Such a participant may be highlighted in the list based on one or more visual indicators. In accordance with an embodiment, faces of the plurality of participants 406 may be registered with names in a list and the list may be added to the smart electronic device 402. For authentication, the same list may be retrieved thereafter. For example, a company A has organized a conference in a Hotel B for the first time. All the employees may be registered with corresponding face and name. Next time the company A organizes another conference in the Hotel B, the same list may be retrieved for the authentication purpose.

Consequently, based on the already created wireless local ad hoc network and the enabled "Client Mode", the first participant 406B, the second participant 406C, and the third participant 406D may select the "Client Mode" at corresponding smart phones, as illustrated in FIG. 4E. Consequently, each of the two or more smart phones instructs the associated participant to hold the respective smart phone in a defined position and orientation. The instructions may be graphic-assisted (option "Graphical Assistance") or voice-assisted (option Voice Assistance") to guide the participants, as illustrated in FIG. 4F. Once each of the two or more smart phones is held by the associated participant in the defined position and orientation, each of the smart phones captures one or more image frames of the associated participant. Each of the two or more smart phones transmits the captured one or more image frames of the associated participant to the smart electronic device 402. The smart electronic device 402 analyzes the one or more image frames of each of the two or more users based on at least face detection, emotion detection, or age estimation of the participant. Accordingly, the smart electronic device 402 authorizes or not authorizes the smart phones, i.e. the first smart phone 404B, the second smart phone 404C, and the third smart phone 404D. In an instance, a haptic indication, such as vibratory indication, may be added before the graphics assistant to seek attention of the two or more users.

Once authorized, the UIs on the two or more smart phones may further present next page that includes a plurality of selection buttons for a plurality of options, such as "Request for Speaking-Slot", "Initiate Audio/Video Stream", "Type for Text Message" and the like. Each participant is prompted to select the first option, "Request for Speaking-Slot", at corresponding smart phone to request the smart electronic device 402 for a speaking slot. Thereafter, each of the two or more smart phones transmits the request for the speaking-slot to the smart electronic device 402, via the wireless local ad hoc network. In accordance with an embodiment, each of the first participant 406B, the second participant 406C, and the third participant 406D may perform mirroring of the screens of respective smart phones on the smart electronic device 402. Accordingly, a desired document may be shown to all participants in the meeting room 400.

The smart electronic device 402 receives a plurality of speaking-slot requests from the two or more smart phones for the content presented by the presenter 406A. Based on the analysis of the one or more image frames of each participant, context of the presented content, and the priority level of each of the two or more participants, the smart electronic device 402 may be configured to accept the speaking-slot request from one smart phone, such as the second smart phone 404C.

In an exemplary scenario, the smart electronic device 402 analyzes the one or more image frames of each participant to determine that, for example the second participant 406C is the senior most team member. Thus, the smart electronic device 402 determines the corresponding priority level as "high".

In another exemplary scenario, the smart electronic device 402 determines that the suitability of the second participant 406C is the highest for the topic "Knowledge Sharing Session on Latest Case Laws", as the second participant 406C is an attorney. Thus, the smart electronic device 402 determines the corresponding priority level as "high".

In yet another exemplary scenario, the smart electronic device 402 sets the priority level of the participants based on a count of times of participation. For example, the first participant 406B has participated maximum number of times. Thus, the smart electronic device 402 determines the corresponding priority level as "low".

In yet another exemplary scenario, the smart electronic device 402 resets the priority level of each of the participants based on first-come first-serve method. The first-come first-serve method may be considered due to an equal count of times of participation of each participant. The first-come first-serve method may be further considered due to similar analysis of one or more image frames of each participant, for example, all the participants are senior team members. In this case, assuming the second participant 406C first entered the queue, the smart electronic device 402 accepts the speaking-slot request from the second participant 406C first.

Consequently, the smart electronic device 402 selects the second smart phone 404C. Based on the selection, the second smart phone 404C is activated to receive input from the associated second participant 406C. In accordance with an embodiment, the second participant 406C may select the option "Initiate Audio/Video Stream" in the UI, as illustrated in FIG. 4G.

Consequently, at a defined position and orientation, adjusted based on assistance provided by the UI illustrated in FIG. 4F, the second participant 406C provides an audio stream from the selected second smart phone 404C. The audio stream may correspond to a spoken response of the second participant 406C to the question raised by the presenter 406A. The audio stream is recorded based on a defined position and orientation at which the second smart phone 404C is held by the second participant 406C. The selected second smart phone 404C transmits the recorded audio stream to the smart electronic device 402, via the wireless local ad hoc network. The speaker system 402A associated with the smart electronic device 402 plays back the received audio stream. In an exemplary scenario, the second participant 406C provides the audio stream in a "Spanish" language different from the common "English" language of the meeting room 400. In such a case, the smart electronic device 402 translates the "Spanish" language of the audio stream to the common "English" language and communicates the translated audio stream to the speaker system 402A.

In another exemplary scenario, the second participant 406C provides an audio stream and a video stream, based on selection of the option "Initiate Audio/Video Stream" as illustrated in FIG. 4G, from the selected second smart phone 404C. The audio stream, as described above, corresponds to a spoken response of the second participant 406C to the question raised by the presenter 406A. The video stream corresponds to a plurality of image frames of the second participant 406C captured in real-time by the associated second smart phone 404C. The audio stream is recorded and the video stream is captured based on a defined position and orientation at which the second smart phone 404C is held by the second participant 406C. The selected second smart phone 404C transmits the recorded audio stream and the captured video stream to the smart electronic device 402, via the wireless local ad hoc network. The speaker system 402A plays back the received audio stream. The projector screen 402B displays the received video stream.

In yet another exemplary scenario, the second participant 406C provide a text message, based on selection of the option "Type for Text Message" as illustrated in FIG. 4G, from the selected second smart phone 404C. The text message is provided based on various factors. For example, a limited time duration is available with the second participant 406C to provide the audio stream or the video stream, the second participant 406C did not get a speaking-slot, or a waiting time exceeds a threshold value in case of queue is quite long. The projector screen 402B displays the received text message. In an instance, the second participant 406C provide the text message in "Spanish" language that is different from the common "English" language of the meeting room 400. In such a case, the smart electronic device 402 translates the "Spanish" language of the text message to the common "English" language and communicates the translated text message to the projector screen 402B. The projector screen 402B displays the translated text message. In accordance with an embodiment, the translated text message may be further converted into a voice stream and played back by the speaker system 402A.

In addition to displaying the received one or more image frames, video streams, and text messages of a current participant, the projector screen 402B further displays other content, such as current participant one or more images and names of other participants in the queue waiting for their turn. Such additional content may be displayed at the projector screen 402B at defined time intervals.

The smart electronic device 402 controls the second smart phone 404C, from which the audio stream, the video stream, or the text message is received, based on one or more parameters. The one or more parameters may correspond to an intervening input provided by the presenter 406A, based on the selection of the option "INTERVENE" as illustrated in FIG. 4D, to seek the answer from another participant. The one or more parameters may further correspond to a defined time limit for the second participant 406C, a change in a position or an orientation of the second smart phone 404C, a change in a topic of the presented content (for example, "Discussion of Client Feedback", or a modified priority level of the second smart phone 404C.

Figure 5:
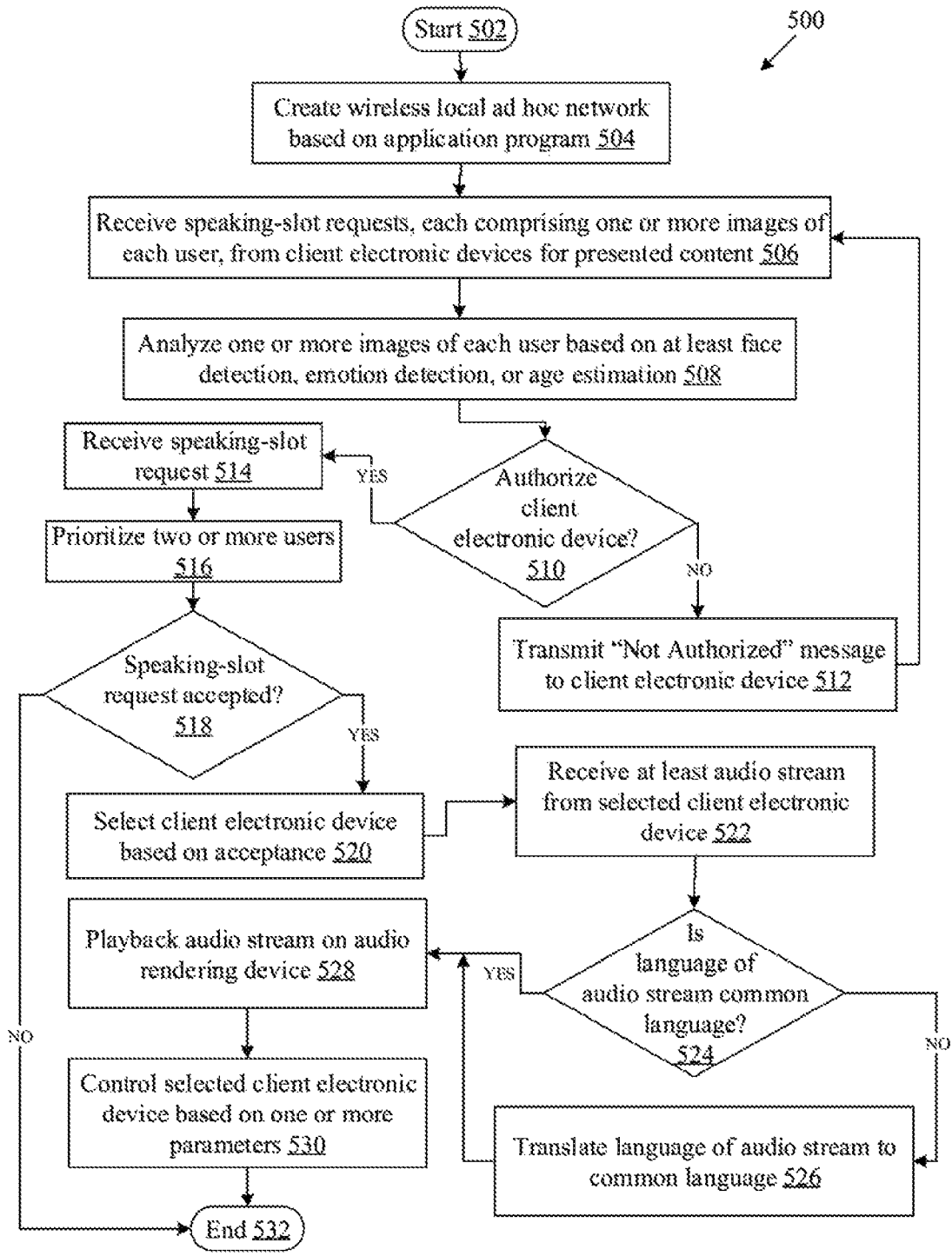
FIG. 5 is a flow chart that illustrates a method implemented in a server for controlling client electronic devices in a wireless local ad hoc network, in accordance with an embodiment of the disclosure.

FIG. 5 is a flow chart that illustrates a method implemented in a server for controlling client electronic devices in a wireless local ad hoc network, in accordance with an embodiment of the disclosure. With reference to FIG. 5, there is shown a flow chart 500. The flow chart 500 is described in conjunction with FIGS. 1 to 4H. The flow chart starts at 502 and ends at 532.

At 504, the wireless local ad hoc network 108 may be created based on an application program. The processor 202 in the server 102 may execute an application program, such as a web application, in a first mode, i.e. the "Server Mode", to create the wireless local ad hoc network 108.

At 506, one or more image frames may be received from each of two or more client electronic devices of the plurality of client electronic devices 104. The processor 202 may be configured to receive the one or more image frames from the two or more client electronic devices when held at a defined position and orientation. The two or more users from the plurality of users 106 may be associated with the two or more client electronic devices from the plurality of client electronic devices 104. One of the plurality of users 106, designated as a moderator or the host user 106A, may present content to the two or more users from the plurality of users 106.

At 508, the one or more image frames of each of the two or more users may be analyzed. The processor 202 may be configured to analyze the one or more image frames of each of the two or more users based on various algorithms, such as face detection, emotion detection, or age estimation, stored in the memory 204. Such an analysis may facilitate the processor 202 to avoid display of false or invalid images on the display device 102B.

At 510, it may be determined whether each of the two or more client electronic devices is to be authorized. Based on the analysis of the one or more image frames of each of the two or more users, the processor 202 may be configured to authorize or not authorize the two or more client electronic devices. The processor 202 may be configured to perform the aforesaid analysis of the one or more image frames based on one or more intelligence or machine learning algorithms retrieved from the memory 204. In cases where a client electronic device, for example the first client electronic device 104B, is not authorized, the control passes to 512. In cases where the client electronic device, for example the first client electronic device 104B, is authorized, the control passes to 514.

At 512, in cases where the client electronic device, for example the first client electronic device 104B, is not authorized or denied authorization, the processor 202 may transmit a message, such as "Not Authorized", to the client electronic device, for example the first client electronic device 104B, and control passes back to 506 to check for the authorization of next client electronic device.

At 514, in cases where the client electronic device, for example the first client electronic device 104B, is authorized, the processor 202 may receive a speaking-slot request from the first client electronic device 104B. The speaking-slot request received in this case may be an authorized speaking slot request with additional data, such as user provided data. At 516, the two or more users may be prioritized. The processor 202 may prioritize the two or more users based on the priority level of each of the two or more users.

At 518, it may be determined whether the speaking-slot request is accepted. The processor 202 may determine the acceptance based on analysis of the one or more image frames, context of the presented content, and the priority level of each of the two or more users, for the client electronic device, for example the first client electronic device 104B. In cases where the speaking-slot request is accepted, control passes to 520. In cases where the speaking-slot request is not accepted, control passes to 532.

At 520, the client electronic device, for example the first client electronic device 104B, is selected based on the acceptance of a corresponding speaking-slot request. Accordingly, the first client electronic device 104B may be activated to receive input from the associated user.

In accordance with an embodiment, the first client electronic device 104B may be the only device that has transmitted the request for the speaking-slot. In such case, the processor 202 may immediately enable the first client electronic device 104B to select the next options to initiate audio/video stream. In accordance with another embodiment, there may be other devices in a queue waiting for their turn to participate and initiate audio/video stream. In such case, the processor 202 may add the first client electronic device 104B to the queue and when the turn of the first client electronic device 104B comes, the processor 202 may activate one or more visual or tactile indicators before a defined time, such as "30 seconds", which may provide a reminder to the first user 106B. Once the defined time has elapsed, the processor 202 may activate the first client electronic device 104B to receive input from the associated user.

At 522, at least an audio stream may be received from the selected client electronic device held at a defined position and orientation. The processor 202 may be configured to receive a recorded audio stream from the selected first client electronic device 104B, via the network interface 210. In accordance with an embodiment, the processor 202 may be configured to receive a recorded audio stream and a captured video stream from the selected first client electronic device 104B, via the network interface 210. In accordance with an embodiment, the processor 202 may be configured to receive a text message from the selected first client electronic device 104B, via the network interface 210. The text message may be provided by the first user 106B when a limited time duration is available with the first user 106B to provide the audio stream or the video stream, or a waiting time of the selected first client electronic device 104B exceeds a threshold value in case of a long queue.

At 524, it may be determined whether the language of the received audio stream is common language of the exemplary network environment 100. In cases where the language of the received audio stream (or the text message) is not the common language, the control passes to 526. In cases where the language of the received audio stream (or the text message) is the common language, the control passes to 528.

At 526, the language of the received audio stream (or the text message) may be translated to the common language. In accordance with an embodiment, the language translator 206 may be configured to translate the language of the audio stream to the common language and communicate the translated audio stream to the audio rendering device 102A. In accordance with an embodiment, the language translator 206 may be configured to translate the language of the text message to the common language and communicate the translated text message to the display device 102B.

At 528, the audio stream may be played back at the audio rendering device 102A. In accordance with an embodiment, the audio rendering device 102A may be configured to playback the received audio stream. In accordance with an embodiment, the display device 102B may be configured to display the translated text message. In accordance with an embodiment, the display device 102B may be further configured to display a video stream when the video stream is also received. In addition to displaying the received one or more image frames, video streams, and text messages of a current user, the display device 102B may further display other content, such as current user name, current user image, one or more images and names of other users in the queue waiting for their turn, as illustrated in FIG. 4H.

At 530, the client electronic device may be controlled based on one or more parameters associated with the selected client electronic device. The processor 202 may be configured to control the first client electronic device 104B, from which the audio stream, the video stream, or the text message is received, based on the one or more parameters, as described in FIG. 2.

Figure 6:
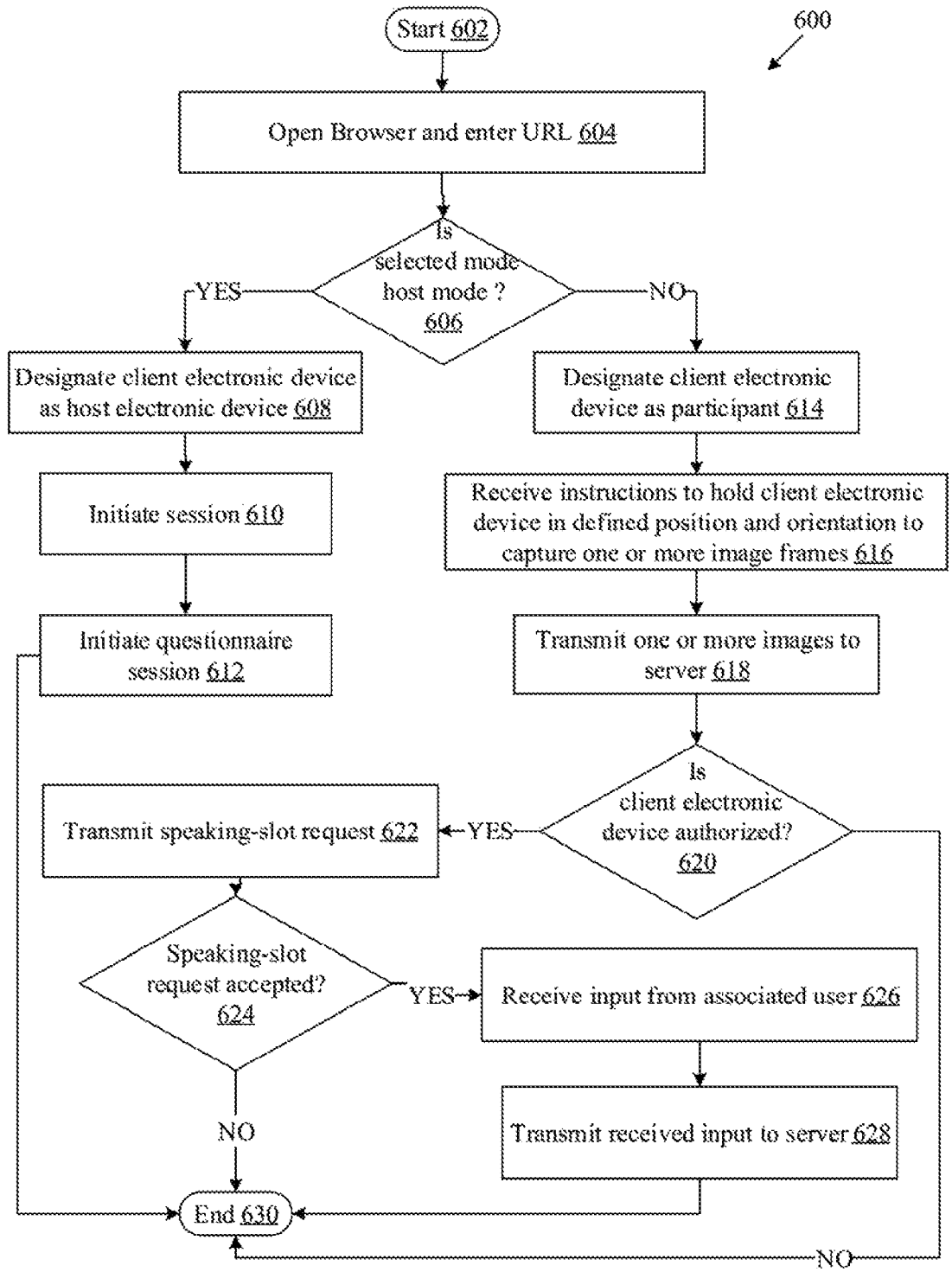
FIG. 6 is a flow chart that illustrates a method implemented in a client electronic device controlled by a server in a wireless local ad hoc network, in accordance with an embodiment of the disclosure.

FIG. 6 is a flow chart that illustrates a method implemented in a client electronic device controlled by a server in a wireless local ad hoc network, in accordance with an embodiment of the disclosure. With reference to FIG. 6, there is shown a flow chart 600. The flow chart 600 is described in conjunction with FIGS. 1 to 4H. The flow chart starts at 602 and ends at 630.

At 604, an application browser may be opened and the URL may be entered. The URL may present a UI at the display screens of the plurality of client electronic devices 104. The UI may present a local page in the application browser that may prompt the corresponding user to initiate a mode. The user may select the second mode, i.e. the "Host Mode", or the third mode, i.e. the "Client Mode"

At 606, it may be determined whether the user selects the second mode, i.e. the "Host Mode", or the third mode, i.e. the "Client Mode". In cases where the user selects the second mode, i.e. the "Host Mode", control passes to 608. In cases where the user selects the third mode, i.e. the "Client Mode", control passes to 614.

At 608, the client electronic device 300 may be designated as the host electronic device 104A and the corresponding user may be designated as the host user 106A.

At 610, a session may be initiated. The processor 302 of the client electronic device 300 may initiate the session. The UI may present a page wherein the host user 106A provides at least name and topic of presentation and initiates a session, similar to the one as illustrated in exemplary UI of FIG. 4C.

At 612, a questionnaire session may be initiated. The processor 302 of the client electronic device 300 may initiate the questionnaire session based on a selection of an option by the host user 106A. The host user 106A may select an option to activate client mode for participants in the application program, as illustrated in FIG. 4D. Consequently, the "Client Mode" is enabled at the client electronic devices of the other users. The host user 106A may select other options, as illustrated in FIG. 4D, to control the session or intervene to seek the response from another user during the session. The control passes to 630.

At 614, the client electronic device 300 may be designated as the participant electronic device and the corresponding user may be designated as a participant.

At 616, the client electronic device 300 may be instructed to be held in a defined position and orientation. The processor 302 in conjunction with the plurality of sensor devices 306 may instruct the user of the client electronic device 300 to hold the client electronic device 300 in a defined position and orientation. The instructions may be graphic-assisted (option "Graphical Assistance") or voice-assisted (option Voice Assistance") to guide the users, as illustrated in FIG. 4F. Once each of the client electronic devices is held by the associated users in the defined position and orientation, each of the client electronic devices captures one or more image frames of the associated user.

At 618, the captured one or more image frames may be transmitted. The processor 302 of the client electronic device (designated as one of the two or more client electronic devices) may transmit the captured one or more image frames to the server 102, via the network interface 310 and the wireless local ad hoc network 108, for authorization.

At 620, it may be determined whether the client electronic device is authorized. The determination may be based on a message, such as "Not Authorized", or another message, such as "Authorized", received from the server 102. In cases where the client electronic device receives the message, such as "Not Authorized", the control passes to 630. In cases where the client electronic device receives the other message, such as "Authorized", the control passes to 622.

At 622, a speaking-slot request may be transmitted to the server 102. The processor 302 may transmit the speaking-slot request to the server 102, via the network interface 310 and the wireless local ad hoc network 108, based on a selection of an option provided by the user. The user may be prompted to select the first option, "Request for Speaking-Slot", at the client electronic device 300 to request the server 102 for a speaking slot.

At 624, it may be determined whether the speaking-slot request is accepted by the server 102. In cases where the speaking-slot request is not accepted, the control passes to 630. In cases where the speaking-slot request is accepted, the control passes to 626.

At 626, the client electronic device 300, for example the first client electronic device 104B, may be activated to receive input from the associated user, such as the first user 106B. The input devices 308 of the client electronic device 300 (designated as, for example the first client electronic device 104B), may be activated to receive input from the user, such as the first user 106B.

In accordance with an embodiment, the first user 106B may provide an audio stream at the microphone 308A of the selected client electronic device 300 (designated as, for example the first client electronic device 104B). The audio stream may correspond to a spoken response of the first user 106B to the questionnaire raised by the host user 106A. The audio stream may be recorded based on a defined position and orientation at which the client electronic device 300 (designated as, for example the first client electronic device 104B) is held by the first user 106B.

In accordance with an embodiment, the first user 106B may provide an audio stream and a video stream at the microphone 308A and the image capturing unit 308B at the selected client electronic device 300 (designated as, for example the first client electronic device 104B). The audio stream, as described above, may correspond to a spoken response of the first user 106B to the questionnaire raised by the host user 106A. The video stream may correspond to a plurality of image frames of the first user 106B captured in real-time by the associated first client electronic device 104B. The audio stream may be recorded and the video stream may be captured based on a defined position and orientation at which the client electronic device 300 (designated as, for example the first client electronic device 104B) is held by the first user 106B.

In accordance with an embodiment, the first user 106B may provide a text message at the keyboard 308C of the selected client electronic device 300 (designated as, for example the first client electronic device 104B). The text message may be provided by the first user 106B when a limited time duration is available with the first user 106B to provide the audio stream or the video stream, or a waiting time of the selected client electronic device 300 (designated as, for example the first client electronic device 104B) exceeds a threshold value in case of a long queue.

At 628, the received input may be transmitted to the server 102. In accordance with an embodiment, the processor 302 in the first client electronic device 104B may be configured to transmit at least one of the recorded audio stream, the captured video stream, and the typed text message to the server 102, via the network interface 310 and the wireless local ad hoc network 108.

In accordance with an embodiment of the disclosure, a system for controlling client electronic devices in a wireless local ad hoc network, is disclosed. The system may comprise one or more circuits in the server 102 (FIG. 1) configured to receive a plurality of speaking-slot requests from one or more of the plurality of client electronic devices 104 (FIG. 1) for a presented content. Each speaking-slot request may comprise at least one or more image frames of a user associated with the client electronic device. A client electronic device, such as first client electronic device 104B (FIG. 1), may be selected based on an acceptance of a corresponding speaking-slot request. The acceptance of the corresponding speaking-slot request may be based on at least an analysis of the one or more image frames of the user, such as the first user 106B (FIG. 1), and a context of the presented content. At least an audio stream provided by the user, i.e. the first user 106B, may be received from the selected client electronic device, i.e. the first client electronic device 104B. The selected client electronic device, i.e. the first client electronic device 104B, may be controlled based on one or more parameters associated with at least the selected client electronic device, i.e. the first client electronic device 104B.

Various embodiments of the disclosure may provide a non-transitory, computer-readable medium and/or storage medium, and/or a non-transitory machine readable medium and/or storage medium stored thereon, a machine code and/or a set of instructions executable by a machine and/or a computer for controlling client electronic devices in a wireless local ad hoc network. The set of instructions may cause the machine and/or computer to perform the steps that comprise receiving a plurality of speaking-slot requests from a plurality of client electronic devices for a presented content. Each speaking-slot request may comprise at least one or more image frames of a user associated with a client electronic device. A client electronic device may be selected based on an acceptance of a corresponding speaking-slot request. The acceptance of the corresponding speaking-slot request may be based on at least an analysis of the one or more image frames of the user and a context of the presented content. At least an audio stream provided by the user may be received from the selected client electronic device. The selected client electronic device may be controlled based on one or more parameters associated with at least the selected client electronic device.

There are various advantages of the disclosed system and method for controlling client electronic devices in a wireless local ad hoc network. The disclosed system and method may add smartness to the existing speaker systems or an electronic device to manage microphones in a public address setup (such as a conferencing system). Thus, the need of manual effort in passing the microphone in the public address setup is mitigated. The speaker system or the electronic device may create a wireless ad hoc network, thus removes the need for extra hardware. There may be no need of application installation at client side. The disclosed system and method facilitates face detection of the users/participants to avoid display of false or invalid pictures. Further, as the user has to hold the microphone, for example the smart phone, in a certain position and orientation while speaking, otherwise the microphone is paused or stopped. This feature facilitates noise cancellation and enhances convenience to the user. Thus, the disclosed system and method facilitates intelligent handling and management of the microphone for a given topic of discussion. Further, there may be no restriction on the spoken language of the users/participants. If the queue is large, users/participants may send a text message which may be displayed on the display screen. The software may be ported to any device with WiFi hardware. With the disclosed system and method, most of the audio/video (NV) devices may be converted into a smart server. Further, as a module, the disclosed system may be interfaced to the AN devices. The users/participants may implement the disclosed system and method through a web application, which may overcome the need of installation of an "app" or hardware limitations.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system, comprising:
    one or more circuits in a server communicatively coupled with a plurality of client electronic devices in a wireless local ad hoc network, wherein the one or more circuits are configured to:
        receive a plurality of speaking-slot requests from the plurality of client electronic devices for presented content;
        select a client electronic device from the plurality of client electronic devices based on an acceptance of a corresponding speaking-slot request of the plurality of speaking-slot requests, wherein the acceptance of the corresponding speaking-slot request is based on at least an analysis of at least one image frame of a user associated with the client electronic device and a context of the presented content;
        receive an audio stream and a video stream from the selected client electronic device; and
        control the selected client electronic device, from which the audio stream and the video stream are received, based on at least one parameter associated with at least the selected client electronic device, wherein the at least one parameter corresponds to a change in a topic of the presented content.

2. The system according to claim 1, wherein the server corresponds to at least one of a speaker system or a television.

3. The system according to claim 1, wherein each of the plurality of client electronic devices corresponds to at least one of a smart phone or a laptop.

4. The system according to claim 1, wherein the one or more circuits are further configured to create the wireless local ad hoc network based on an application program.

5. The system according to claim 1, wherein the acceptance of the corresponding speaking-slot request is further based on a priority level of the selected client electronic device.

6. The system according to claim 5, wherein the one or more circuits are further configured to set the priority level of the user based on a count of times of participation of the user associated with the client electronic device.

7. The system according to claim 5, wherein
    the one or more circuits are further configured to reset the priority level of a plurality of users based on first-come first-serve method, and
    the first-come first-serve method is based on one of an equal count of times of participation of each user of the plurality of users associated with a corresponding client electronic device of the plurality of client electronic devices, or a similar analysis of a plurality of video clips of the plurality of users associated with the plurality of client electronic devices.

8. The system according to claim 1, wherein
the one or more circuits are further configured to receive a text message from the selected client electronic device, and
the text message is received based on one of a limited time duration available with the user to provide one of the audio stream or the video stream, or a waiting time of the selected client electronic device that exceeds a threshold value.

9. The system according to claim 8, wherein the one or more circuits are further configured to translate one of a language of the text message or the audio stream into a defined language.

10. The system according to claim 9, wherein the one or more circuits are further configured to display the translated text message at a display device associated with the server.

11. The system according to claim 9, wherein the one or more circuits are further configured to playback the translated audio stream at an audio rendering device associated with the server.

12. The system according to claim 1, wherein the one or more circuits are further configured to display the received video stream at a display device associated with the server.

13. The system according to claim 1, wherein the one or more circuits are further configured to analyze the at least one image frame of the user based on at least one of face detection, emotion detection, or age estimation of the user.

14. The system according to claim 13, wherein
the one or more circuits are further configured to authorize the client electronic device based on the analysis of the at least one image frame of the user, and
the selection of the client electronic device is further based on the authorization.

15. The system according to claim 1, wherein the selected client electronic device receives the audio stream and the video stream based on a defined position and orientation at which the selected client electronic device is held by the user.

16. The system according to claim 1, wherein the one or more circuits are further configured to connect with a new client electronic device from an external network.

17. The system according to claim 1, wherein the at least one parameter further corresponds to at least one of an input provided at a host electronic device that presents the content, a defined time limit for the user, a change in a position or an orientation of the selected client electronic device or a modified priority level of the user.

18. A method, comprising:
in a server that comprises one or more circuits:
receiving, by the one or more circuits, a plurality of speaking-slot requests from a plurality of client electronic devices for presented content;
selecting, by the one or more circuits, a client electronic device from the plurality of client electronic devices based on an acceptance of a corresponding speaking-slot request of the plurality of speaking-slot requests, wherein the acceptance of the corresponding speaking-slot request is based on at least an analysis of at least one image frame of a user associated with the client electronic device and a context of the presented content;
receiving, by the one or more circuits, an audio stream and a video stream from the selected client electronic device; and
controlling, by the one or more circuits, the selected client electronic device, from which the audio stream and the video stream are received, based on at least one parameter associated with at least the selected client electronic device, wherein the at least one parameter corresponds to a change in a topic of the presented content.

19. The method according to claim 18, wherein the at least one parameter further corresponds to at least one of an input provided at a host electronic device that presents the content, a defined time limit for the user, a change in a position or an orientation of the selected client electronic device, or a modified priority level of the user.

* * * * *